United States Patent [19]

Kral

[11] 3,760,164

[45] Sept. 18, 1973

[54] MAGNETICALLY STRIPED CARDS FOR USE IN A SPEED MACHINE

[75] Inventor: Fred G. Kral, Lake Villa, Ill.

[73] Assignee: Bell & Howell Company, Chicago, Ill.

[22] Filed: Nov. 10, 1972

[21] Appl. No.: 305,399

Related U.S. Application Data

[62] Division of Ser. No. 67,451, Aug. 27, 1972, Pat. No. 3,712,973.

[52] U.S. Cl.... 235/61.12 N, 35/35 C, 235/61.11 D, 235/61.12 M, 235/61.12 C

[51] Int. Cl... G09b 19/04, G06k 19/08, G06k 7/06, G06k 7/08

[58] Field of Search ............. 235/61.11 D, 61.12 M, 235/61.12 R, 61.12 N; 35/35 C; 179/100.2 S; 235/61.11 R

[56] References Cited

UNITED STATES PATENTS

| | | | |
|---|---|---|---|
| 3,477,141 | 11/1969 | Davidson | 35/35 C |
| 3,477,140 | 11/1969 | Ryan | 35/35 C |
| 3,236,428 | 2/1966 | Yamane | 235/61.11 R |
| 3,114,150 | 12/1963 | Calano | 235/61.12 M |
| 3,585,369 | 6/1971 | Nather | 235/61.11 R |

*Primary Examiner*—Maynard R. Wilbur
*Assistant Examiner*—Robert M. Kilgore
*Attorney*—William F. Pinsak et al.

[57] ABSTRACT

Disclosed is a novel information card having a conductive control stripe in addition to a known magnetic stripe and a machine for accepting the novel card and prior art cards and for transporting the cards at different pre-set rates depending on the rate at which the card was transported when recorded. The control stripe on a card actuates a control circuit of the transport machine by closing a selecting circuit through a card sensor so that the machine will transport cards with and without stripes at a selected of the pre-set rates.

4 Claims, 4 Drawing Figures

PATENTED SEP 18 1973 3,760,164

MAGNETICALLY STRIPED CARDS FOR USE IN A SPEED MACHINE

This is a division of Ser. No. 67,451, filed on Aug. 27, 1970, now U.S. Pat. No. 3,712,973.

The present invention relates generally to improvements in teaching devices and more particularly to a new and improved teaching machine and information cards for use therewith, together providing greater versatility than has been possible in the past with teaching machines and cards of this class.

Teaching machines employing a feed roller for engaging information cards for feeding the cards through a guide channel past a transducing or read-out station are known in the art. Generally speaking, such machines transport the card past a transducing head which reads a sound track containing a magnetic recording of selected audio information. Corresponding and cooperating information is usually printed on the card to stimulate the student visually at substantially the same time as the student is being stimulated audibly. For use in the existing machines, cards have been recorded for reproduction at a single rate of transport, generally 2 ¼ inches per second. For several years, this rate approached a standard in view of technological limitations which caused the sound output at a lower speed to be unacceptable as to fidelity, and higher speeds to be unacceptable due to maximum length of the audio track for a given card length.

To provide a card of a given length with increased length of audio information has been a continuing desire for educators. That is, the quantity of audible information from a card of a given length can be increased to nearly double the present quantity if the rate of card transport is reduced by half. Due to improvements in technology, such cards can be made and machines adapted to accept these cards. Because of the large number of cards and of teaching machines operating at the standard rate for those cards in the field currently, it is desirable to enable any new machine to be usable with the older high speed card as well as with the new low speed cards. Because of the likelihood that the cards will be intermixed during use, it is desirable further that the new machines be capable of distinguishing between the older cards and the newer cards, and that the cards be distinguishable to the machine so as to be transported past the transducer at the rate at which the card has been recorded.

Accordingly, a primary object of this invention is to provide a teaching machine which can use interchangeable information cards recorded at different rates.

A further object of this invention is the provision of a new and improved information card which controls its rate of feed through a teaching machine capable of distinguishing one card series from another.

Another object of this invention is the provision of a new and unobvious teaching machine capable of transporting cards at different rates and having sensing means for distinguishing at which rate each card is to be transported.

The above discussed objects and advantages of this invention are achieved by the use of an information card as is known in the prior art, an information card of the new type having thereon a conductive control stripe, and a machine which will accept the cards. The cards of either class are adapted to be manually moved to a position on a teaching machine wherein a card sensing switch is actuated to energize the drive and audio systems of the machine. Should a prior art card be inserted and actuate the sensor, the machine would operate at the higher speed at which these cards were recorded. However, should a new card having a control stripe be inserted in the machine, in addition to energizing the drive motor, a selecting circuit responsive to completion of a secondary circuit by the control stripe will alter the rate of operation of the machine so that the drive will transport the card at the desired pre-set rate for the new cards. By this arrangement, each card inserted into the machine will cause the machine to drive that card at the rate intended for that card.

Other objects and advantages of this invention will be appreciated with reference to the following detailed description taken in connection with the accompanying drawings in which like reference numerals designate like parts throughout the figures thereof.

Figures 1, 2, 3:
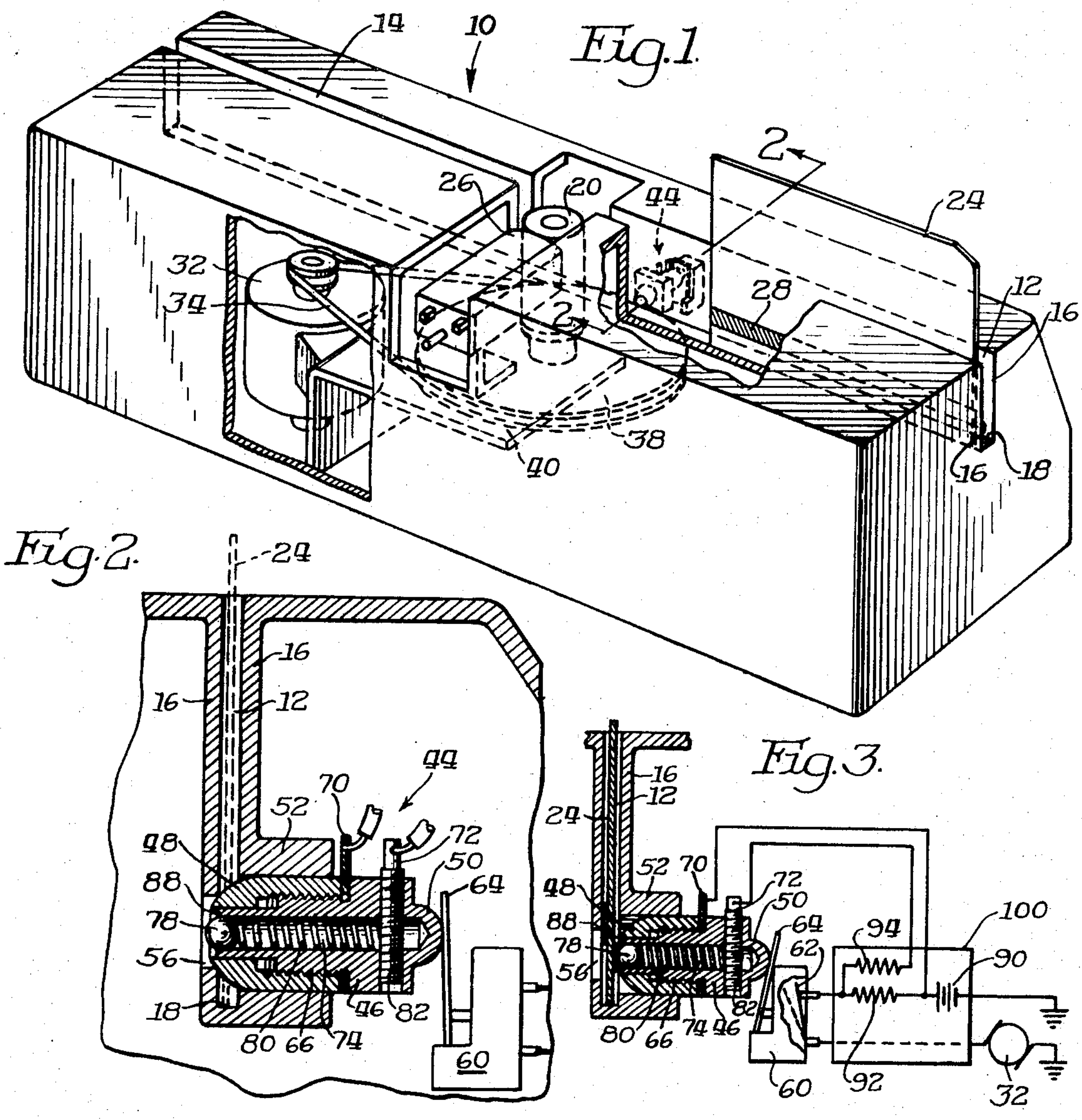
FIG. 1 is a perspective view of a portion of a teaching machine illustrating a preferred embodiment.
FIG. 2 is an enlarged sectional view taken along line 2—2 of FIG. 1 showing a sensor with parts cut away.
Figure 4:
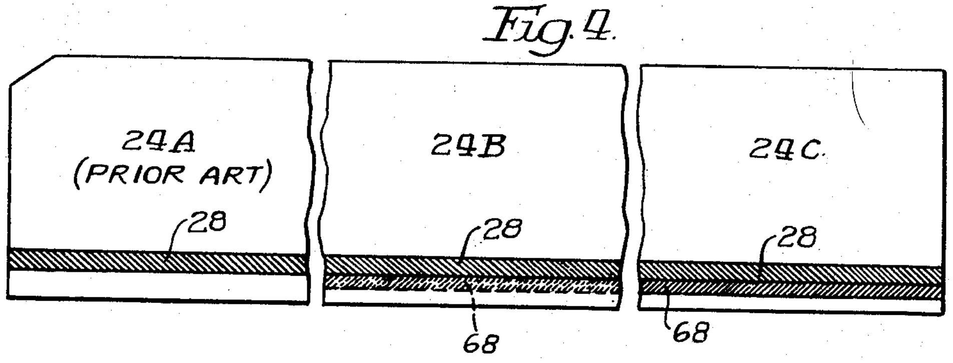

FIG. 3 is a schematic view of the card sensor circuit cooperating with a machine for actuating the machine at a selected rate; and FIG. 4 illustrates a typical card divided respectively to show (A) the prior art type having only a magnetic stripe, (B) a control stripe on the face of the card opposite that face supporting the magnetic stripe, and (C) a control stripe on the same face of the card as a magnetic stripe.

As shown in FIG. 1, there is an information card transport mechanism, generally designated 10, which includes first and second portions 12, 14 of a U-shaped channel, together defining a card guide path. Each channel comprises side walls 16 and a bottom portion 18. A feed roller or capstan 20 is located immediately adjacent the card guide path to engage and transport a card 24 past a transducer 26.

Transducer or record/reproduce head 26 is connected to known recording/reproducing circuitry so that audio information may be recorded on and reproduced from a magnetic media stripe 28 fixed to the card. A prior art type card, shown in FIG. 4 at A, has a magnetic stripe 28 of known material, which stripe has been applied to the card in a known manner.

When a card 24 is introduced in guide channel 12, capstan 20 is powered to transport the card by a motor 32 connected to a belt 34 and a pulley 38 to which the capstan is drivably connected. Capstan 20 is located either adjacent a back-up roller (not shown) or transducer 26 which is attached to the frame of the transport mechanism by a bracket 40. To control energization of motor 32 and audio circuitry (not shown), a card presence sensor 44 is connected electrically therewith. Sensor 44 is arranged to extend into a card guide channel portion so as to be actuated upon displacement by a card in the channel portion.

Sensor 44, of partially known construction, comprises a body portion 46 having a nose end portion 48 and a rearwardly located abutment portion 50. As seen in FIG. 2, the sensor is supported in a bearing portion 52 which extends from one wall 16 of channel 12. Substantially centered and aligned with bearing 52 is a cutout 56 formed in the opposite channel wall to receive the forward end of sensor 44 when no card is present in channel 12. When a card is present in the channel, sensor 44 is physically displaced thereby. A micro-switch 60 is disposed in the path of abutment portion 50 of the sensor. Internally of the switch 60 is a normally open circuit making contact 62 operably connected for actuation by an external sensor engaging blade 64 of the switch. When no card is present in the channel, contact 62 is in circuit open condition and is moved to circuit completed condition by blade 64 when sensor 44 is displaced upon introduction of a card in the channel. Sufficient force is provided by means internal of the micro-switch 60 (not shown) to urge nose end 48 of sensor 44 into cut-out 56 when a card is not present. Because a portion of sensor 44 overlies channel 12, an introduced card displaces sensor 44 by an amount greater than the thickness of that card.

The above described construction of a card transporting machine and card for use therewith is known in principle. Operation of the machine is initiated by placement of an information card 24 in first channel 12 in which the card is moved toward sensor 44 and feed roller 20. When the lead end of the card engages sensor 44, motor 32 and transducer 26 are energized. As the card is moved into engagement with the feed roller, the now operating roller transports the card past the transducer. When the card clears sensor 44, the sensor releases switch 60 thereby de-energizing the machine until another card is introduced.

A card striped in accordance with the present invention is represented in FIG. 4 at B and C. Such a card is provided not only with a magnetic stripe 28 as is the prior art card A, but also with coding, such as an electrically conductive control strip 68. The control stripe may be applied to substantially the full length of the card along a sensor engaging path on either the same face of the card as the magnetic stripe, as shown at C, or to the face of the card opposite that to which the magnetic stripe is fixed, as shown at B, which arrangement forms the preferred embodiment. The metallic control stripe may be applied to the card by known methods, such as hot stamping.

To enable the machine or transport 10 to respond to the presence of a card bearing a control stripe 68, and to enable the transport to distinguish that card from an unstriped card, modifications of sensor 44 are provided which enable the sensor to perform a dual function. As hereinbefore described, sensor 44 has a body portion 46 which is axially displaceable in bearing portion 52 of channel 12. When a card is passed through the card guide channel, the abutment end portion 50 of sensor 44 engages blade 64 of microswitch 60 to cause contact 62 to complete the circuit through the switch. The nose portion 48 of sensor 44 is formed of either a metallic material or a metal coated material and is suitably attached to the body portion, such as by cooperating threads 66.

A terminal 70 is preferably in conducting engagement with the rear end of nose piece 48, but may be integral therewith. Another conducting terminal 72 is supported on body portion 46 which is formed of insulating material. An axial bore 74, open to the nose end, is formed in the body portion to retainingly receive a ball-like contact 78. A coil spring 80 is enclosed within the bore in the body portion to urge the ball contact forwardly. The opposite end of spring 80 engages a stop lug shown as a threaded member 82 from which the terminal 72 extends exteriorly of the sensor body portion.

Ball contact 78, coil spring 80, and stop lug 82 are formed of or coated with conductive material to define a circuit through which a current can be passed. As seen in FIG. 2, ball contact 78 is pressed outwardly of sensor 44 slightly ahead of nose piece 48. A thinned extension 88 of body portion 46 insulates the ball contact from nose piece 48. As a card passes sensor 44, initial engagement is against nose piece 48 to displace all of the assembly. Further engagement of a card causes ball contact 78 to be displaced within bore 74 in the body member. When the ball contact and the end of the nose piece are in the same plane, the control stripe 68 on a card completes a circuit permitting current to pass from terminal 70 through the nose piece 48, the control stripe 68, the ball contact 78, the spring 80, and threaded member 82 to terminal 72.

A preferred transport control circuit 100 is shown schematically in FIG. 3. Motor 32, preferably a small DC motor, is connected to micro-switch 60 to be energized by DC source 90 when a card passes in the channel portion to complete the circuit. A resistance 92 of selected ohmic value is in circuit with motor 32 to control and pre-set the rate of motor operation to transport a card at a first selected rate. A second resistance 94 is connected in series with terminals 70, 72 and in parallel with first resistance 92 to cause motor 32 to operate at a reduced but pre-set rate from the first selected rate when the circuit through this second resistance is completed by a control stripe 68 on a card 24. That is, the transport will drive a card at a first rate if the secondary circuit is open, and at a second rate if the secondary circuit is completed.

Modifications or substitutions can be made in the card without departing from the spirit and scope of the invention.

What is claimed is:

1. A record and machine control card member for use in an audio transducing machine having a card guide path, a transducer oriented along said guide path, a drive operable at a selected of a plurality of pre-set drive speeds for causing transducing of information from said card member at one of said selected speeds and being responsive to said machine control on said card member for transducing of information on said card member at another of said selected speeds, the record and machine control card member comprising:

a generally planar card having at least two discrete support surface areas;

an elongate magnetic media carried on one of said support surface areas being transducable by said transducer at a selected one of said pre-set speeds upon energization of said drive; and an electrically-conductive drive speed control media carried on another of said discrete support surface areas in co-extensive relationship with said magnetic media to actuate said drive to another selected speed incident to energization of said drive by said card.

2. A record card member for use in an audio transducing machine having a card guide path, a transducer oriented along said guide path and a drive operable for effecting transducing of information from said record card member, said record card member comprising:

a generally planar card having two discrete support surface portions;

an elongate magnetic media fixed to one of said support surface portions of said card to provide an information signal transducable by said machine; and an electrically-conductive media fixed to the other of add support surface portions in parallel, co-extensive relationship with said magnetic media to provide a signal adapted to be sensed for drive speed control.

3. A record card member as in claim 2, wherein said magnetic media is carried on one face of said card and said electrically-conductive media is disposed on the same face of said card.

4. A record card member as in claim 2, wherein said magnetic media is carried on one face of said card and said electrically-conductive media is disposed on the opposite face of said card.

* * * * *

UNITED STATES PATENT OFFICE

CERTIFICATE OF CORRECTION

Patent No. 3,760,164 Dated: 9/18/73

Inventor(s) Fred G. Kral

It is certified that error appears in the above-identified patent and that said Letters Patent are hereby corrected as shown below:

In the Title: Insert --DUAL-- before "SPEED".

Signed and sealed this 31st day of December 1974.

(SEAL)
Attest:

McCOY M. GIBSON JR.
Attesting Officer

C. MARSHALL DANN
Commissioner of Patents